(12) United States Patent
Mruczek et al.

(10) Patent No.: US 12,365,042 B2
(45) Date of Patent: Jul. 22, 2025

(54) SYSTEMS AND METHODS FOR WIRE ARC ADDITIVE MANUFACTURING

(71) Applicant: National Oilwell Varco, L.P., Houston, TX (US)

(72) Inventors: Mark Mruczek, Houston, TX (US); Carl Torres, Jr., Houston, TX (US); Chris Desadier, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 636 days.

(21) Appl. No.: 17/226,840

(22) Filed: Apr. 9, 2021

(65) Prior Publication Data

US 2022/0324047 A1 Oct. 13, 2022

(51) Int. Cl.

| | |
|---|---|
| *B23K 9/04* | (2006.01) |
| *B23K 9/00* | (2006.01) |
| *B23K 9/16* | (2006.01) |
| *B23K 35/38* | (2006.01) |
| *B23K 37/04* | (2006.01) |
| *B33Y 10/00* | (2015.01) |
| *B33Y 30/00* | (2015.01) |
| *B33Y 80/00* | (2015.01) |
| *B23K 101/10* | (2006.01) |

(52) U.S. Cl.
CPC .............. *B23K 9/04* (2013.01); *B23K 9/0026* (2013.01); *B23K 9/164* (2013.01); *B23K 35/38* (2013.01); *B23K 37/0452* (2013.01); *B33Y 10/00* (2014.12); *B33Y 30/00* (2014.12); *B33Y 80/00* (2014.12); *B23K 2101/10* (2018.08)

(58) Field of Classification Search
CPC .......... B23K 9/04; B23K 9/042; B23K 9/044; B23K 9/046; B32K 9/048
See application file for complete search history.

(56) References Cited

U.S. PATENT DOCUMENTS

| | | | |
|---|---|---|---|
| 2015/0273586 A1* | 10/2015 | Ross ..................... | E21B 17/042 219/76.14 |
| 2016/0221106 A1* | 8/2016 | Bush ..................... | B23K 9/232 |
| 2017/0341149 A1* | 11/2017 | Clements ............... | B33Y 40/20 |
| 2018/0147669 A1* | 5/2018 | Narayanan ......... | B23K 26/0006 |

(Continued)

FOREIGN PATENT DOCUMENTS

| | | | | |
|---|---|---|---|---|
| CN | 109623097 A | * | 4/2019 | |
| CN | 111730177 A | * | 10/2020 | ............... B23K 9/04 |

(Continued)

OTHER PUBLICATIONS

Nov-Viper, National Oilwell Varco, Viper Connectors (2017) (Year: 2017).*

*Primary Examiner* — John J Norton
(74) *Attorney, Agent, or Firm* — Nolte Lackenbach Siegel (57) ABSTRACT

A system, a non-transitory computer readable medium for executing instructions, and a method for fabricating a subsea connector, including selecting a substrate on which to form the subsea connector, positioning the substrate on a welding positioner base, and applying a first weld bead using a first multiple axis robot, applying a second weld bead using a second multiple axis robot, forming a plurality of weld bead layers comprising the first weld bead and the second weld bead, and forming a subsea connector formed from the plurality of weld bead layers.

19 Claims, 6 Drawing Sheets

(56) References Cited

U.S. PATENT DOCUMENTS

| | | | |
|---|---|---|---|
| 2020/0038983 A1* | 2/2020 | Sato | B33Y 10/00 |
| 2020/0206815 A1* | 7/2020 | Breziat | B22F 5/106 |
| 2021/0016381 A1* | 1/2021 | Sales | B33Y 50/02 |
| 2021/0031443 A1* | 2/2021 | Amanatides | B22F 10/00 |
| 2021/0129440 A1* | 5/2021 | Schumann | B29C 64/379 |
| 2021/0187855 A1* | 6/2021 | Cardon | B22F 10/18 |
| 2022/0050249 A1* | 2/2022 | Hilbeck | H01R 13/533 |

FOREIGN PATENT DOCUMENTS

| | | | | |
|---|---|---|---|---|
| CN | 112139635 A | * | 12/2020 | B23K 9/04 |
| WO | WO-2020183176 A1 | * | 9/2020 | B33Y 10/00 |

* cited by examiner

SYSTEMS AND METHODS FOR WIRE ARC ADDITIVE MANUFACTURING

BACKGROUND

The hydrocarbon drilling and production industries use various types of connectors when connecting sections of pipe in subsea operations. During such operations, drill pipe, production pipe, and the like may be deposited hundreds and even thousands of feet underwater. Each section of pipe may be connected using subsea connectors. Such connectors are typically fabricated by forging the pipe, then machining or otherwise milling the connection, which is composed of one more or threads. Such threadable connections typically have a pin end, which is inserted and threaded onto a corresponding box end. Due to the conditions in subsea applications, the connector, and thus the connections, have to be accurate and precise. The conditions in which subsea connectors are used may further require subsea connectors that are more robust and capable of handling, for example, high pressures, salt water, corrosive chemical, and the like.

There has been a growing interest in power-fed metal additive manufacturing in recent times with respect to connections in different industries. In certain industries, powder-fed systems, such as laser metal deposition and laser engineered net shaping blow powder through a nozzle, which is melted by a laser or electron beam on the surface of a part. The process may be effective, but is expensive, requires controlled environments, and is used to fabricate relatively small components. Moreover, the powder used in such systems is expensive and is not always readily available.

Accordingly, metal additive manufacturing is not employed by the hydrocarbon drilling and production industries. More specifically, subsea connectors for pipe are fabricated using the process of forging, machining, and/or milling described above. The limitations of such fabrication results in subsea connectors that are not easily customizable and also results in fabrication techniques that have limited adaptability to address changing environmental or use conditions.

It should be understood that the background is provided to aid in an understanding of the present invention and that nothing in the background section shall be construed as an admission of prior art in relation to the inventions described herein.

BRIEF SUMMARY OF THE INVENTION

In an embodiment of the present disclosure, a method for fabricating a subsea connector may include: selecting a substrate on which to form the subsea connector; positioning the substrate on a welding positioner base; applying a first weld bead using a first multiple axis robot; applying a second weld bead using a second multiple axis robot; forming a plurality of weld bead layers comprising the first weld bead and the second weld bead; and forming the subsea connector from the plurality of weld bead layers. The first weld bead may be applied using tungsten arc welding and the second weld bead may be applied using submerged arc welding. The first bead and the second bead may be applied at the same time. The first weld bead may be applied using three wires. The first weld bead may be include a first metal and the second weld bead may include a second metal that is different from the first metal. The subsea connector may be formed directly onto the substrate. The method may further include changing a wire in at least one of the first multiple axis robot and the second multiple axis robot during the forming of the plurality of weld bead layers. The substrate may include a pipe. Adding the first weld bead and adding the second weld bead may occur in series. The subsea connector may include at least one of a pin connector and a box connector.

In a further embodiment of the present disclosure, system for fabricating a subsea connector may include: a welding positioner for holding a substrate; a first multiple axis robot for depositing a first weld bead on the substrate, wherein the first multiple axis robot comprises a first welding torch; and a second multiple axis robot for depositing a second weld bead on the substrate. The second multiple axis robot may include a second welding torch that is different from the first welding torch. The first welding torch may include a gas tungsten arc welding torch and the second welding torch may be a submerged arc welding torch. The first welding torch may include three wires. The first weld bead and the second weld bead may be applied to the substrate at the same time. The substrate may be a pipe. The first weld bead and the second weld bead may form a plurality of weld bead layers that form the subsea connector. The first weld bead may include a first metal. The second weld bead may include a second metal. The second metal may be different than the first metal. The first multiple axis robot and the second multiple axis robot may each include at least sex axes. The first welding torch and the second welding torch may each comprise at least one wire.

In a still further embodiment of the present disclosure, a non-transitory computer readable medium comprising computer executable instructions stored thereon that, when executed by one or more processing units cause the one or more processing units to: apply a first weld bead using a first multiple axis robot to a substrate; apply a second weld bead using a second multiple axis robot to the substrate; form a plurality of weld bead layers comprising the first weld bead and the second weld bead on the substrate; and form a subsea connector formed from the plurality of weld bead layers on the substrate. The first weld bead may be applied using gas tungsten arc welding and the second weld bead may be applied using submerged arc welding.

These and other aspects of the present disclosure are more fully described herein with reference to the accompanying figures.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described for every example in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, the term "substantially" as used herein means a majority, or almost all, or all, or an amount with a range of about 51% to about 100%, for example. Moreover, examples herein are intended to be illustrative only and are presented for discussion purposes and not by way of limitation.

Embodiments of the present disclosure may provide systems and methods for wire arc additive manufacturing that allows for the design and fabrication of subsea connectors, along with other parts for use in, for example, the drilling and hydrocarbon production industries. In certain aspects, multiple axis robots may be used to employ multiple welding processes, such as gas metal arc welding ("GMAW"), submerged-arc welding ("SAW"), gas tungsten arc welding ("GTAW"), cold metal transfer welding ("CMT"), and the like, for the fabrication of subsea connectors.

Wire arc additive manufacturing generates components by building up a material, such as carbon steel, aluminum, titanium, as well as other metals and metal alloys, layer-by-layer. The particular layers of metal and metal alloys may be formed by a melting wire electrode. Because of the precision of wire arc additive manufacturing, complex geometries, such as those that may be used for subsea connectors, may be formed.

During the normal manufacturing process for subsea connectors, the connectors, such as casing connections, are individually forged then machined or milled to produce a connection having a desired geometry. Embodiments of the present disclosure may avoid the forging, machining, and milling, thereby allowing a connection to be built directly on a pipe. Accordingly, the connections may be created and then installed, or may be created in situ, thereby avoiding additional cost. Moreover, because of the accuracy and precision of wire arc additive manufacturing, the types of connections may be customized for a particular application and/or operation.

Use of wire arc additive manufacturing may further allow for the manufacture of specialized and/or one of a kind parts for a specific application. Wire arc additive manufacturing may also allow for the mixing of specific alloys, new alloys, and customized alloys for particular operations. Furthermore, threadable sections of subsea connectors may be specifically customized, and different sections of the threadable connection may be varied, by changing the wire used during wire arc additive manufacturing. Thus, a single connection may be fabricated using multiple alloys at desired locations, which may result in connections having greater strength and/or resistance to wear and damage.

The use of wire arc additive manufacturing may include the use of multiple axis robots. Multiple axis robots may carry torches used in one or more of the welding techniques described above, thereby allowing multiple welding to be used in a single fabrication operation. For example, one or more multiple axis robots may be used to employ both a SAW welding technique and a GMAW technique in fabricating a single subsea connector. In other embodiments the welding operation may include employing both SAW and CMT. In certain embodiments, multiple welding techniques may be used at the same time, while in other embodiments multiple welding techniques may be used in series, such that only one welding technique is used at a single point in time. Examples of multiple axis robots and application of the above described welding techniques in the design and fabrication of subsea connectors will be described in detail below.

Figure 1:
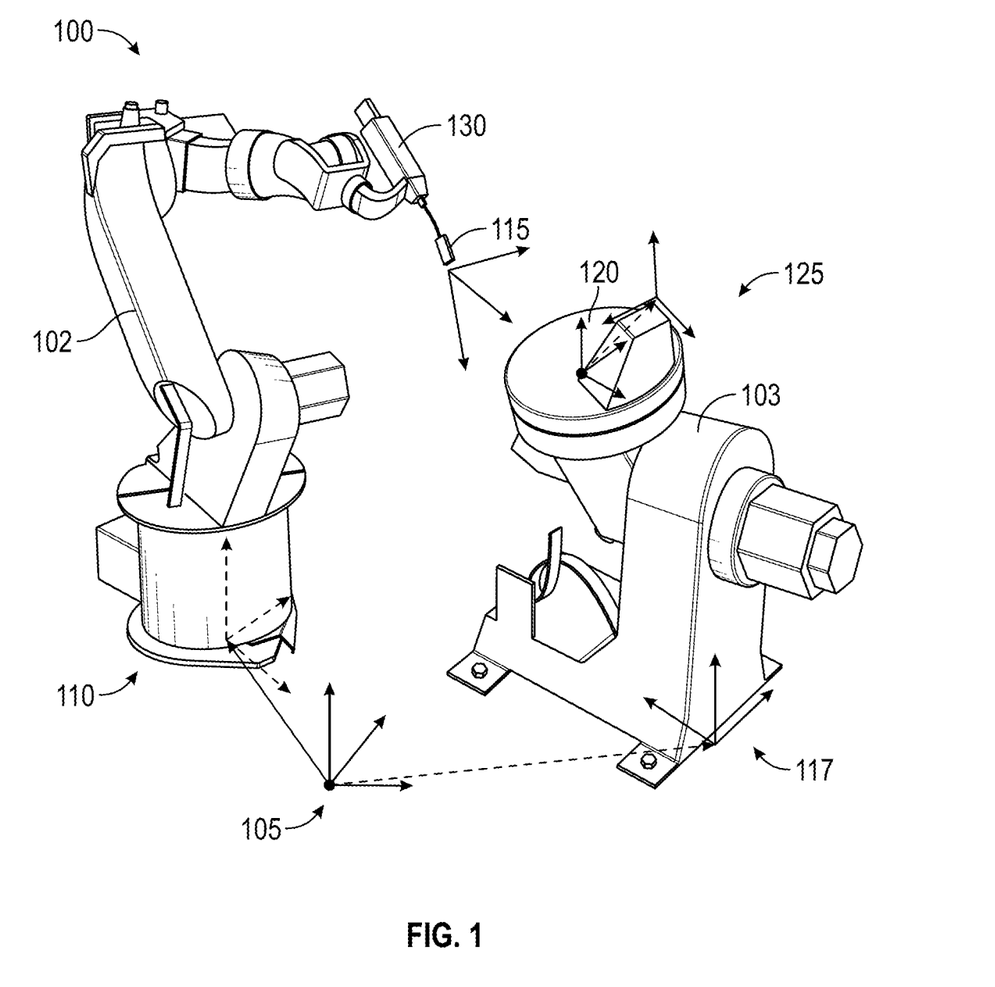
FIG. 1 is a side perspective view of a multiple axis robot according to embodiments of the present disclosure.

Turning to FIG. 1, a side perspective view of a multiple axis robot according to embodiments of the present disclosure is shown. Multiple axis robot 100 may be configured to move in three, four, five, six, or more axes, which may allow for movement in the x plane, y plane, z plane, as well as allow for rotational movement using roll, pitch, and yaw. By allowing movement along six axes, rotational axe and/or planes, multiple axis robot 100 may be used to produce complex geometries using wire arc additive manufacturing techniques. Multiple axis robot 100 may include a robotic arm 102, as well as a base 103. Robotic arm 102 may move freely in multiple planes and using various rotational abilities with respect to base 103. Base 103 may be used to hold a part, substrate, or the like, thereby allowing metal to be deposited thereon during wire arc additive manufacturing.

In using multiple axis robot 100, a root coordinate system, referred to as $WORLD 105, may be established, such that specific bases from multiple axis robot 100 bases may be offset from $WORLD 105. In certain embodiments, $ROBROOT 110 may be offset from $WORLD 105, such that $ROBROOT 110 corresponds to the center of the base of multiple axis robot 100. $ROBROOT 110 may remain constant during use, so that the center of the base is known, thereby allowing multiple axis robot 100 to move freely and/or be track mounted, thereby increasing manufacturing flexibility.

During operation, $TOOL 115 may also be set, thereby allowing the x axis, y axis, z axis, roll, pitch, and yaw values to be set and/or adjusted. Base 103 may have a root coordinate system ROOT 117, which may define an orientation of base 103. Base 103 may also have various other coordinate systems, defined from a flange 120, and offset 125, and the like, thereby allowing the special orientation of base 103 relative to robotic arm 102 to be known. By having such predefined coordinate systems in place, during operation, the relative location of robotic arm 102 to base 103 may be known, thereby allowing for the fabrication of complex component geometries.

Robotic arm 102 may be used to hold and control one or more torches 130 used in wire arc additive manufacturing. As briefly discussed above, various types of wire arc additive manufacturing man be used according to embodiments of the present disclosure. GMAW may be used, wherein a single torch is used. GMAW uses a continuous solid wire electrode that travels through a welding gun, which also uses a shielding gas, i.e., an inert gas, to prevent contamination of the metal being deposited onto a substrate.

SAW may use a flux-coated electrode that is connected to a power source and touches a base metal to produce a specific weld. GTAW similar to GMAW in that it uses tungsten as an inert gas but uses a wire that acts as a filler material. GTAW heats up specific objects by using a tungsten electrode that delivers current to a welding arc. The welding arc then melts a metal and creates a liquid pool. A filler may then be added to further increase the strength of the weld. CMT is a variation of GMAW that uses a back and forth motion of a wire to create a controlled short circuit transfer of material, which minimizes spatter and requires less heat input. One or more of the above identified welding methods, as well as other methods that may be known to those of ordinary skill in the art having the benefit of this disclosure may be used with multiple axis robot 100 to create subsea connectors according to embodiments of the present disclosure.

Figure 2:
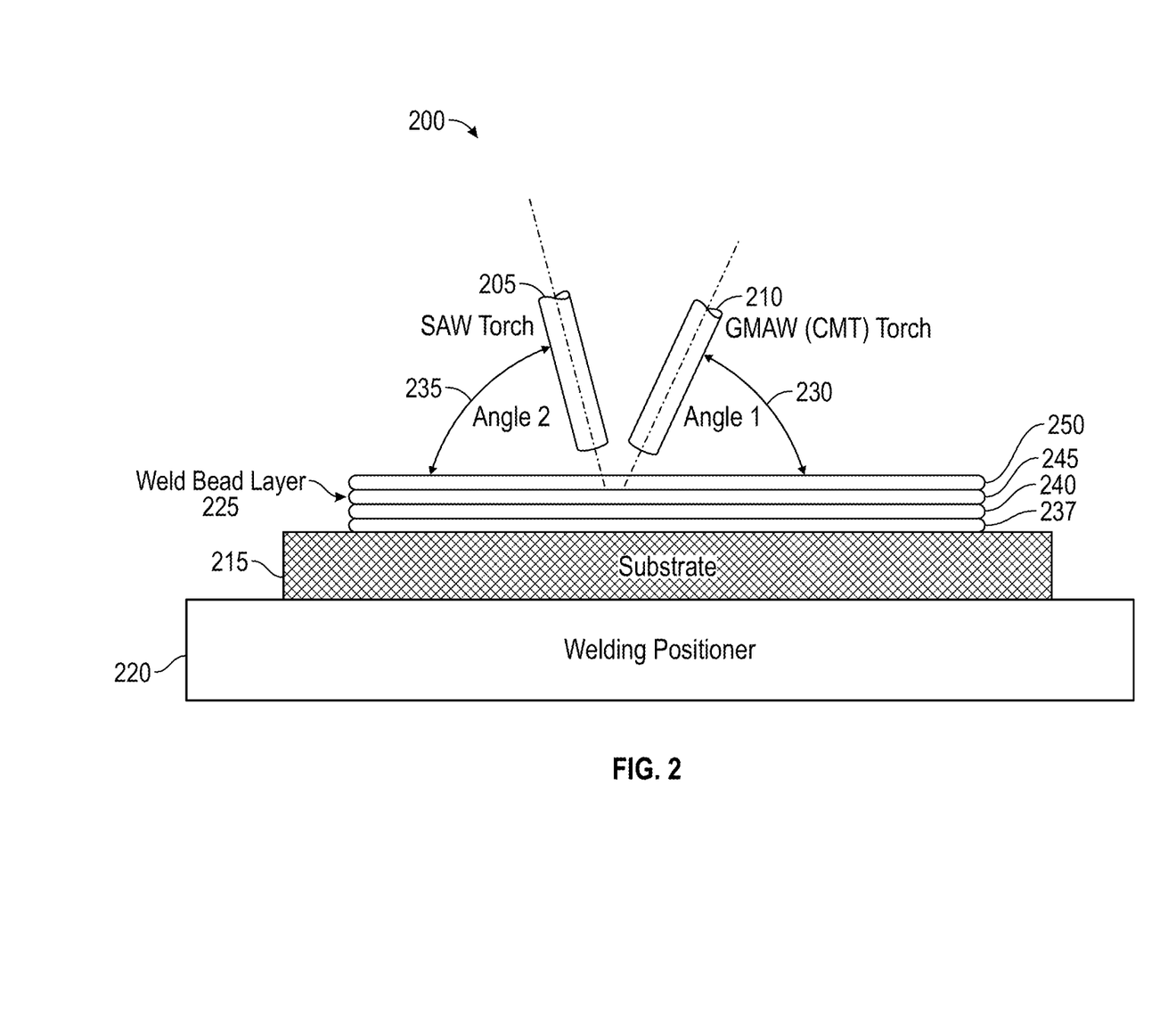
FIG. 2 is a side schematic view of a welding process according to embodiments of the present disclosure.

Turning to FIG. 2, a side schematic view of a welding process according to embodiments of the present disclosure is shown. In this embodiment, a welding process 200 is shown using two welding torches, SAW torch 205 and GMAW torch 210. SAW torch 205 and GMAW torch 210, may be disposed on or otherwise held by one or more multiple axis robots, such as the multiple axis robot described with respect to FIG. 1. For example, in one embodiment, a first multiple axis robot may hold SAW torch 205, while a second multiple axis robot may hold GMAW torch 210. In another embodiment, both SAW torch 205 and GMAW torch 210 may be held by a single multiple axis robot.

During operation, a substrate 215 may be placed on a welding positioner 220. Substrate 215 may include a component part onto which a connector is set to be fabricated. Examples of substrate 215 may include a subsea connection, a pipe, a plate, a prior connection, and/or any other substrate 215 onto which a connection may be formed. Welding positioner 220 may be a surface of a base, such as the base described with respect to FIG. 1. The welding positioner 220 may hold substrate 215 in place, thereby preventing movement of substrate 215 during fabrication. Accordingly, the one or more multiple axis robots and components thereof may move relative to substrate 215, thereby allowing the subsea connector to be formed.

SAW torch 205 may include a single wire or may include multiple wires. In one embodiment, SAW torch 205 may include three wires, in which two wires are relatively hot and one wire is relatively cold. Both SAW torch 205 and GMAW torch 210 may be powered using either alternative current or direct current, depending on the location and requirements of the fabrication operation. Because SAW torch 205 and GMAW torch 210 may be operated independently, each torch 205/210 may have a different angular position with respect to a weld bead layers 225. For example, GMAW torch 210 may have a first angular orientation 230, while SAW torch 205 has a second angular orientation 235. The angular orientations 230/235 may vary during fabrication, and the movement of the multiple axis robot changes to fabricate the type of subsea connection that is desired.

Additionally, the angular orientations 230/235 may vary according to three, four, five, six or more axes, such as an x-axis, y-axis, z-axis, or a rotational axis such as pitch, roll, and yaw.

During operation, SAW torch 205 and GMAW torch 210 may work together or independently to deposit weld bead layers 225. Accordingly, a first weld bead layer 237 may be deposited first, followed by a second weld bead layer 240, a third weld bead layer 245, a fourth weld bead layer 250, and the like. As many weld bead layers 225 may be deposited until the desired geometry of the subsea connector is fabricated. In certain embodiments, relatively few weld bead layers 225 may be required, while in other embodiments, hundreds or even thousands of weld bead layers 225 may be required.

The types of metals and/or metal alloys that are used may be the same for both SAW torch 205 and GMAW torch 210, or the metal in each may be different. Thus, SAW torch 205 may deposit a first metal or metal alloy, while GMAW torch 210 deposits a second type of metal or metal alloys. As such, the application of a specific metal or metal alloy may be changed during operation, thereby allowing for customization of the subsea connection. Additionally, SAW torch 205 and GMAW torch 210 may each have a different metal or metal alloy, which is applied at the same time, thereby allowing additional, potentially more complex, alloys to be employed in subsea connection fabrication. Certain embodiments may also allow for flexibility, such that the metal and metal alloys may be changed for each of SAW torch 205 and GMAW torch 210, thereby allowing connections to have different metal or metal alloys at different sections of the particular subsea connection.

The ability to vary the location of the multiple axis robot and the flexibility of the fabrication techniques due to the use of multiple welding techniques may thereby allow a specific material to be deposited in a desired location. For example, rather than forging an entire subsea connector from a single alloy, then machining the subsea connector to form threads and the like, substrate 215 may be a specific pipe, then weld bead layers 225 may be deposited on the pipe to form a specific subsea connector. Accordingly, customized subsea connections having complex geometries and metal alloy profiles may be fabricated.

Figure 3:
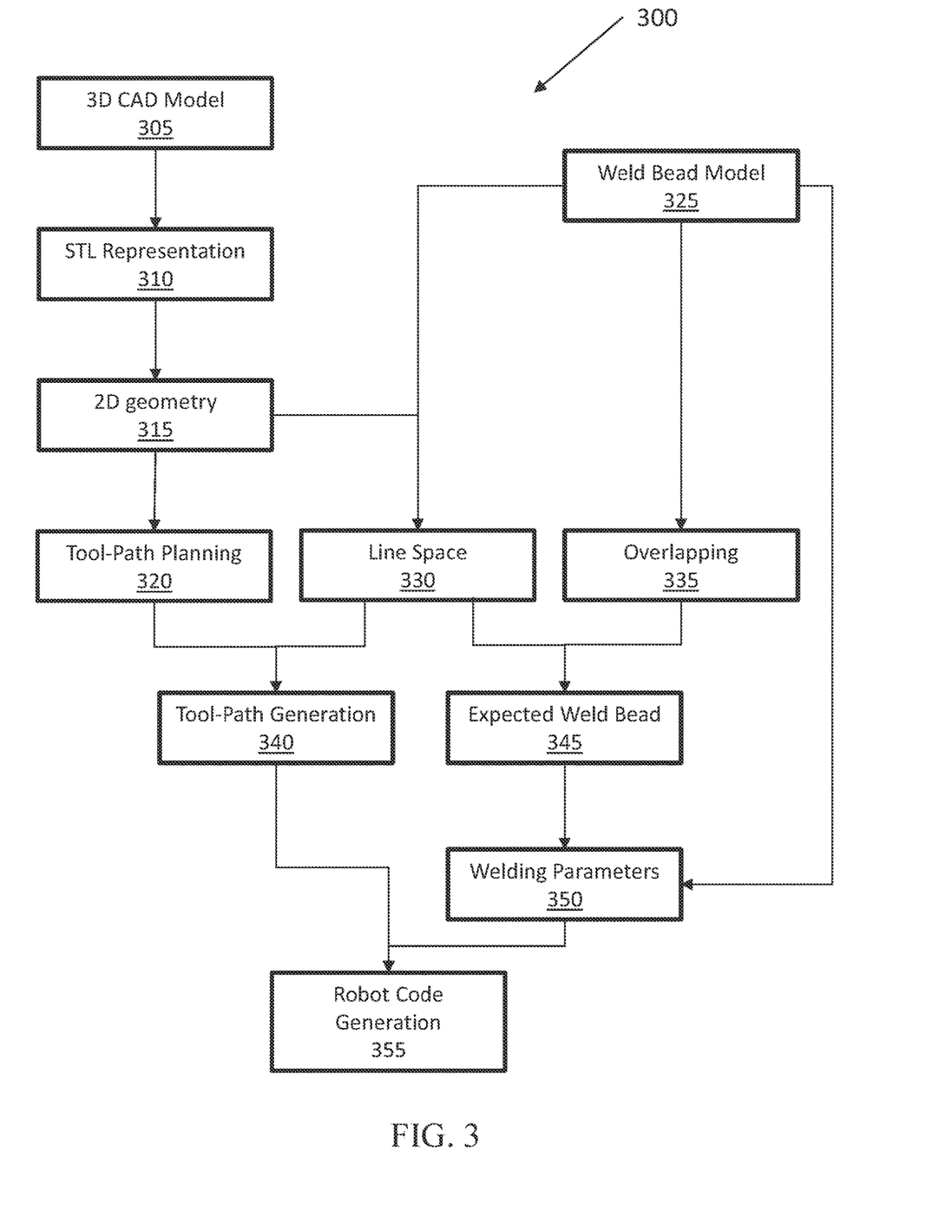
FIG. 3 is a flowchart of a method for subsea connector fabrication using multiple axis robots according to embodiments of the present disclosure.

Turning to FIG. 3, a flowchart of a method 300 for subsea connector fabrication using multiple axis robots according to embodiments of the present disclosure is shown. During the design and fabrication of subsea connectors, one or more multiple axis robots, such as those described with respect to FIG. 1 may be programmed. The programming of such multiple axis robots may thereby allow complex geometries and/or metal alloy deposition in forming the subsea connectors.

Initially, a three-dimensional computer animated drawing ("CAD") model 305 is generated. Three-dimensional computer animated drawing model 305 may include a model of the geometry for the subsea connectors, and as such, may provide the schematic design for how the subsea connectors will be fabricated. Three-dimensional computer animated drawing model 305 may include various parameters such as, geometry, shape, thread profile, thread height, thread length, thread depth, pin profile, box profile, and the like. The three-dimensional computer animated drawing model 305 may be generated using unique software, separator from the program code used to program the multiple axis robots, and as such, may be saved in the form of executable code saved to a non-transitory media, such as a memory, hard drive, and the like.

Method 300 may further include providing a stereolithography representation 310, in the form of a model, that is extracted or otherwise uses the three-dimensional computer animated drawing model 305. Stereolithography representation 310 may be used to validate the three-dimensional computer animated drawing model 305, extract features, or otherwise analyze the three-dimensional computer animated drawing model 305.

Using the three-dimensional computer animated drawing model 305 and the stereolithography representation 310, a two-dimensional geometry model 315 for the subsea connector may be created. Two-dimensional geometry model 315 may be used to define the geometric profile for the subsea connector that is then used in tool-path planning 320, which will ultimately result in the code that is provided to the multiple axis robots.

Separately, a weld bead model 325 may be generated, which defines the location where each of the multiple axis robots will deposit metal and/or metal allows on the substrate, i.e., a subsea connector, modeled in steps 305, 310, and 315. In systems using more than one multiple axis robots, a separate weld bead model 325 may be developed for each of the multiple axis robots. The weld bead model 325 may then be exported along with the two-dimensional geometry 315 to generate line spacing 330.

The weld bead model 325 may also be used to determine overlapping 335, which defines where the two or more multiple axis robots will deposit metal and/or metal alloys contemporaneously. For example, overlapping 335 may be used to combine code for two or more multiple axis robots, thereby allowing for code that ultimately allows the robots to coordinate during operation. The coordination may thereby allow both multiple axis robots to deposit metal and/or metal allow at the same time or in a desired sequence to fabricate a subsea connector.

Tool-path planning 320 and line space 330 may then be used to in constructing a tool-path generation 340. The weld bead model 325 allows for line spacing 330 of the welding to be combined with the location where the multiple axis robots are planned to be, so that the tool-path generation 340 may be provided. Additionally, the line spacing 330 and the overlapping 335 may be used to generate an expected weld bead 345. The expected weld bead 345 includes the combined weld beads for each of the multiple axis robots, which in operations allows them to coordinate.

The expected weld bead 345 may then be modified according to specific welding parameters 350. Welding parameters may include, for example, a torch type, process type, coordination properties, a heat, a bead structure, a number of wires, a type of power, a type of metal, a type of metal alloy, a timing, etc. When the tool-path generation 340 has occurred and the welding parameters 350 are defined, robot code generation 355 may occur. Robot code generation may include the final set of instructions for both multiple axis robots that allows the multiple axis robots to coordinate to produce the desired subsea connector.

Figure 4:
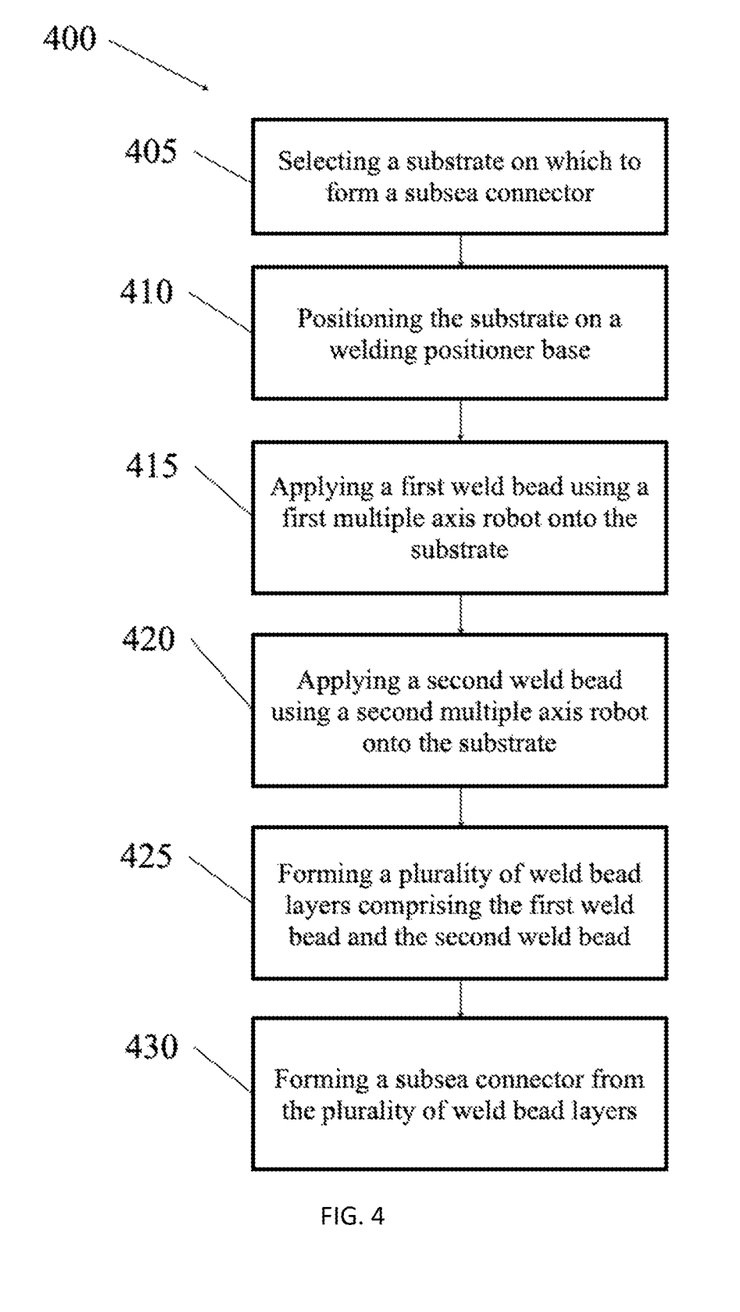
FIG. 4 is a flowchart for a method of fabricating a subsea connector according to embodiments of the present disclosure.

Turning to FIG. 4, a flowchart for a method of fabricating a subsea connector according to embodiments of the present disclosure is shown. In this embodiment, method 400 includes selecting (block 405) a substrate on which to form a subsea connector. The substrate may include, for examples, pipes, plates, existing connections, and the like. The substrate may be formed from, for example, metal, metal alloys, composites, and combinations thereof. In certain embodiments, the substrate may include a section of pipe to be used in subsea operations involving hydrocarbon drilling and/or production.

In operation, method 400 may further include positioning (block 410) the substrate on a welding positioner base. The welding positioner base may include a base section associated with one or more multiple axis robots. As such, the welding positioner base may include a component that is integrated with one or more multiple axis robots or may be a structural component that separate from such multiple axis robots.

In operation, method 400 may further include applying (block 415) a first weld bead using a first multiple axis robot onto the substrate. The application of the first weld bead may include using a welding torch that is connected, mechanically engaged, or otherwise integral to a first multiple axis robot. The first weld bead may be applied using, for example, one or more of GMAW and/or SAW, as discussed in detail above.

In operation, method 400 may further include applying (block 420) a second weld bead using a second multiple axis robot onto the substrate. The application of the second weld bead may include using a welding torch that is connected or otherwise integral to a second multiple axis robot. The second weld bead may be applied using, for example, one or more of GMAW and/or SAW, as discussed in detail above. In certain operations, the second weld bead may include a metal or metal alloy that is different from the first weld bead. Additionally, the second weld bead may be applied using a welding process that is different from how the first weld bead is applied. In certain embodiments, the second weld bead is applied at the same time as the first weld bead, while in other operations the first and second weld beads may be applied in sequence. The weld beads may also be applied using, for example, one, two, three, or more wires.

In operation, method 400 may further include forming (block 425) a plurality of weld bead layers comprising the first weld bead and the second weld bead. The plurality of weld bead layers may be composed of the first and second weld beads together or one weld bead layer may be composed entirely of the first weld bead while another weld bead layer may be composed entirely of the second weld bead. Depending on the requirements of the operation, the plurality of weld bead layers may include tens, hundreds, or even thousands of layers.

In operation, method 400 may further include forming (block 430) the subsea connector from the plurality of weld bead layers. The subsea connector may be formed directly on the substrate. For example, a pipe used in hydrocarbon drilling and/or production may have the plurality of weld bead layers directly deposited thereon, allowing the subsea connection to be formed on the pipe, rather than forging the pipe and then machining or milling the connection. The subsea connector may include at least one of a pin and a box, and may include various thread forms, both simple and complex, such as premium thread connections.

During operation, to form customized subsea connectors, one or more wires associated with the multiple axis robots may be changed, thereby allowing the materials being deposited on the substrate to be varied. As such, subsea connectors may be formed from a plurality of metals and/or metal alloys, and different sections of the connector may be formed from different metals and/or metal alloys.

Figure 5:
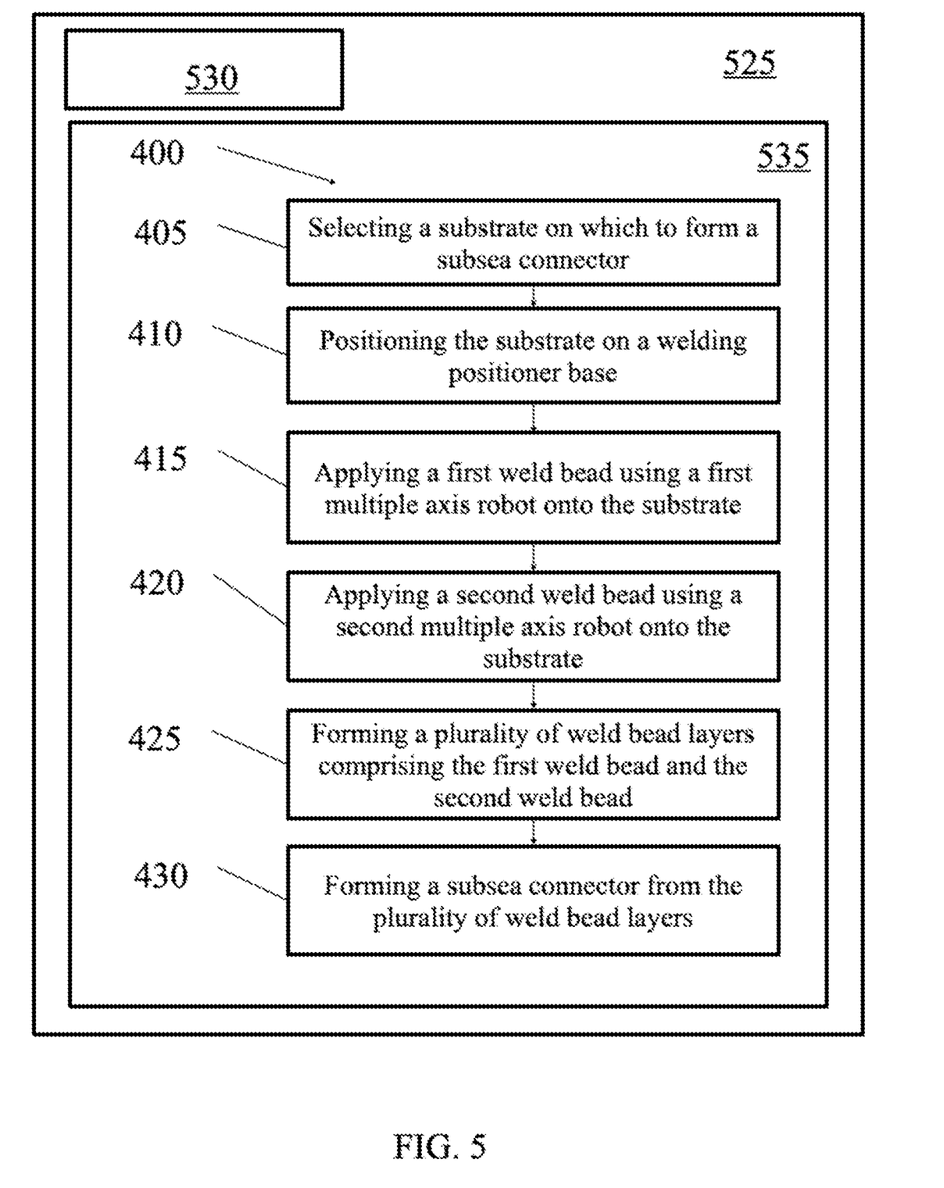
FIG. 5 is an example computing device with a hardware processor and accessible machine-readable instructions is shown in accordance with one or more examples of the present disclosure.

Turning now to FIG. 5, an example computing device with a hardware processor and accessible machine-readable instructions is shown in accordance with one or more examples of the present disclosure is shown. FIG. 5 provides the same structural components discussed above with respect to FIG. 4, and as such, for purposes of clarity, only the differences in the figures will be discussed herein. FIG.

5 provides is an example computing device 525, with a hardware processor 530, and accessible machine-readable instructions stored on a machine-readable medium 535 for managing data as discussed above with respect to one or more disclosed example implementations. FIG. 5 illustrates computing device 625 configured to perform the flow described in blocks 405, 410, 415, 420, 425, and 430 discussed in detail with respect to FIG. 4. However, computing device 525 may also be configured to perform the flow of other methods, techniques, functions, or processes described in this disclosure.

Figure 6:
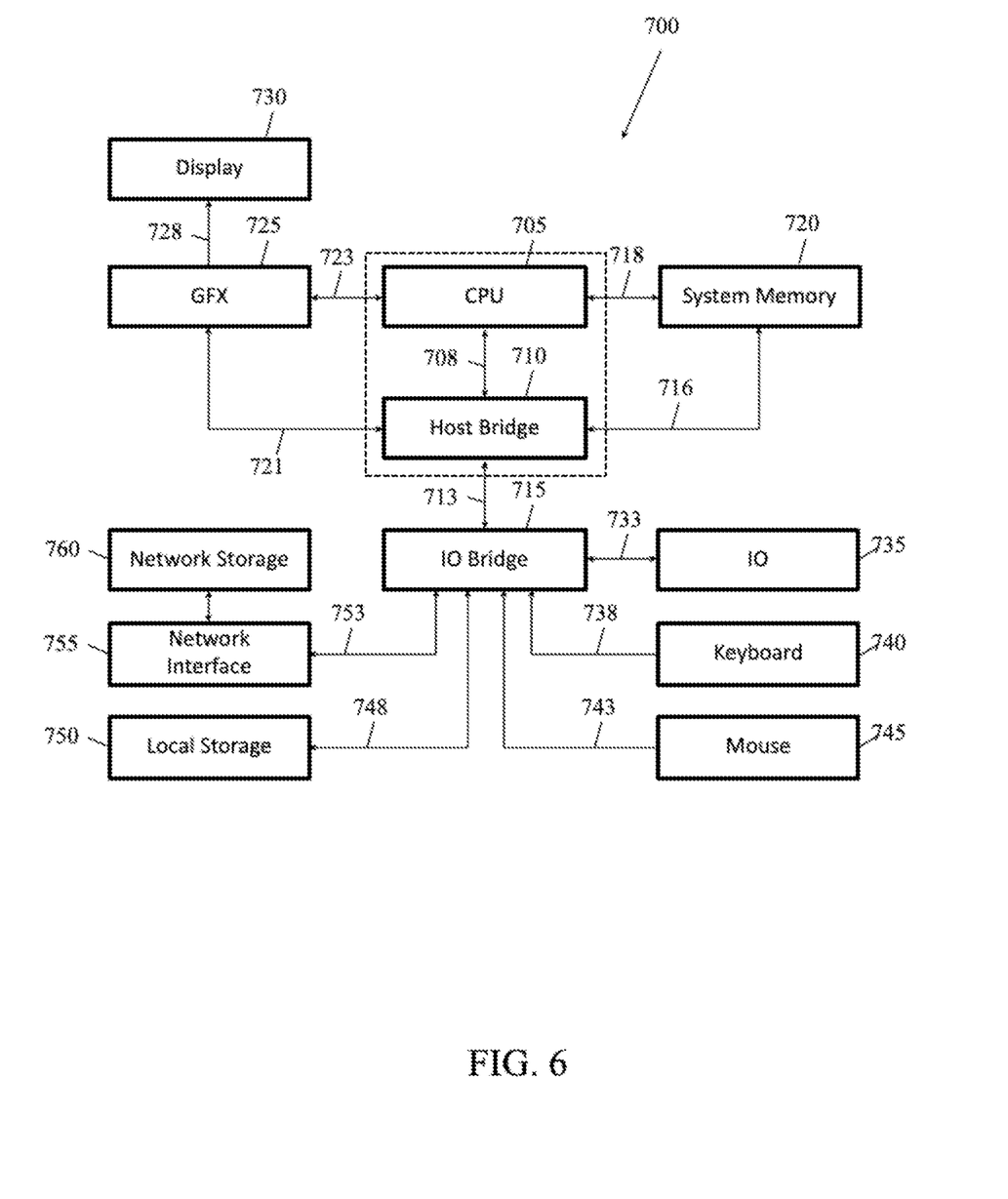
FIG. 6 is a schematic representation of a computer processing device that may be used to implement functions and processes in accordance with one or more examples of the present disclosure.

Referring now to FIG. 6, a schematic representation of a computer processing device 700 that may be used to implement functions and processes in accordance with one or more examples of the present disclosure is shown. FIG. 6 illustrates a computer processing device 600 that may be used to implement the systems, methods, and processes of this disclosure. For example, computer processing device 700 illustrated in FIG. 6 could represent a client device or a physical server device and include either hardware or virtual processor(s) depending on the level of abstraction of the computing device. In some instances (without abstraction), computer processing device 700 and its elements, as shown in FIG. 6, each relate to physical hardware. Alternatively, in some instances one, more, or all of the elements could be implemented using emulators or virtual machines as levels of abstraction. In any case, no matter how many levels of abstraction away from the physical hardware, computer processing device 700 at its lowest level may be implemented on physical hardware. In one implementation, computer processing device 700 may allow a subscriber to remotely access one or more data centers. Similarly, the management tool used by the subscriber may include a software solution that runs on such a computer processing device 700.

FIG. 6 shows a computer processing device 700 in accordance with one or more examples of the present disclosure. Computer processing device 700 may be used to implement aspects of the present disclosure, such as aspects associated with the design and programming of multiple axis robot used in the fabrication of subsea connectors. Computer processing device 700 may include one or more central processing units (singular "CPU" or plural "CPUs") 705 disposed on one or more printed circuit boards (not otherwise shown). Computer processing device 700 may further include any type of processing deice or programmable logic controller known in the ark.

Each of the one or more CPUs 705 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computer processing device 700 may include one or more core logic devices such as, for example, host bridge 710 and input/output ("IO") bridge 715.

CPU 705 may include an interface 708 to host bridge 710, an interface 718 to system memory 720, and an interface 723 to one or more IO devices, such as, for example, graphics processing unit ("GFX") 725. GFX 725 may include one or more graphics processor cores (not independently shown) and an interface 728 to display 730. In certain embodiments, CPU 705 may integrate the functionality of GFX 725 and interface directly (not shown) with display 730. Host bridge 710 may include an interface 708 to CPU 705, an interface 713 to IO bridge 715, for embodiments where CPU 705 does not include interface 718 to system memory 720, an interface 716 to system memory 720, and for embodiments where CPU 705 does not include integrated GFX 725 or interface 723 to GFX 725, an interface 721 to GFX 725.

One of ordinary skill in the art will recognize that CPU 705 and host bridge 710 may be integrated, in whole or in part, to reduce chip count, motherboard footprint, thermal design power, and power consumption. IO bridge 715 may include an interface 713 to host bridge 710, one or more interfaces 733 to one or more IO expansion devices 735, an interface 738 to keyboard 740, an interface 743 to mouse 745, an interface 748 to one or more local storage devices 750, and an interface 753 to one or more network interface devices 755.

Each local storage device 750 may be a solid-state memory device, a solid-state memory device array, a hard disk drive, a hard disk drive array, or any other non-transitory computer readable medium. Each network interface device 755 may provide one or more network interfaces including, for example, Ethernet, Fibre Channel, WiMAX, Wi-Fi, Bluetooth, or any other network protocol suitable to facilitate networked communications. Computer processing device 700 may include one or more network-attached storage devices 760 in addition to, or instead of, one or more local storage devices 750. Network-attached storage device 760 may be a solid-state memory device, a solid-state memory device array, a hard disk drive, a hard disk drive array, or any other non-transitory computer readable medium. Network-attached storage device 760 may or may not be collocated with computer processing device 700 and may be accessible to computer processing device 700 via one or more network interfaces provided by one or more network interface devices 755.

One of ordinary skill in the art will recognize that computer processing device 700 may include one or more application specific integrated circuits ("ASICs") that are configured to perform a certain function, such as, for example, hashing (not shown), in a more efficient manner. The one or more ASICs may interface directly with an interface of CPU 705, host bridge 710, or IO bridge 715. Alternatively, an application-specific computing device (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 705, host bridge 710, IO bridge 715, or ASICs or various sub-sets, super-sets, or combinations of functions or features thereof, may be integrated, in whole or in part, or distributed among various devices in a way that may vary based on an application, design, or form factor in accordance with one or more example embodiments. As such, the description of computer processing device 700 is merely exemplary and not intended to limit the type, kind, or configuration of components that constitute a computing device suitable for performing computing operations, including, but not limited to, hashing functions. Additionally, one of ordinary skill in the art will recognize that computing device 700, an application specific computing device (not shown), or combination thereof, may be disposed in a standalone, desktop, server, or rack mountable form factor.

One of ordinary skill in the art will recognize that computing device 700 may be a cloud-based server, a server, a workstation, a desktop, a laptop, a netbook, a tablet, a smartphone, a mobile device, and/or any other type of computing device in accordance with one or more example embodiments.

In certain embodiments, advantages of the present disclosure may provide systems and methods to fabricate subsea connectors directly onto a substrate, such as a pipe, for use in hydrocarbon drilling and production operations.

In certain embodiments, advantages of the present disclosure may provide systems and methods that allow for more accurate design and fabrication of subsea connectors for use in hydrocarbon drilling and production operations.

In certain embodiments, advantages of the present disclosure may provide systems and methods that allow for more precise design and fabrication of subsea connectors for use in hydrocarbon drilling and production operations.

In certain embodiments, advantages of the present disclosure may provide systems and method that allow customized subsea connectors for use in hydrocarbon drilling and production operations.

In certain embodiments, advantages of the present disclosure may provide systems and methods that allow for faster fabrication of subsea connectors for use in hydrocarbon drilling and production operations.

In certain embodiments, advantages of the present disclosure may provide systems and methods for fabrication of subsea connectors that have lower heat inputs and decreased internal costs.

Note that embodiments may exhibit one, none, or all of the advantages mentioned above. Furthermore, embodiments may not all manifest any given advantage to the same extent or degree as other embodiments.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for fabricating a load bearing, threaded subsea connector, the method comprising:
   selecting a substrate on which to form the subsea connector;
   positioning the substrate on a welding positioner base;
   applying a first weld bead comprising a first metal to the substrate using a first multiple axis robot;
   applying a second weld bead comprising a second metal different from the first metal to the substrate using a second multiple axis robot;
   forming a plurality of weld bead layers comprising the first weld bead and the second weld bead; and
   forming the subsea connector from the plurality of weld bead layers, including the threads of the threaded subsea connector.

2. The method of claim 1, wherein the first weld bead is applied using gas tungsten arc welding and the second weld bead is applied using submerged arc welding.

3. The method of claim 2, wherein the first and second weld beads are applied at the same time.

4. The method of claim 1, wherein the first weld bead is applied using three wires.

5. The method of claim 1, wherein the subsea connector is formed directly onto the substrate.

6. The method of claim 1, further comprising changing a wire in at least one of the first multiple axis robot and the second multiple axis robot during the forming of the plurality of weld bead layers.

7. The method of claim 1, wherein the substrate comprises a pipe.

8. The method of claim 1, wherein the adding the first weld bead and the adding of the second weld bead occur in series.

9. The method of claim 1, wherein the subsea connector comprises at least one of a pin connector and a box connector.

10. A system for fabricating a load bearing, threaded subsea connector, the system comprising:
    a welding positioner for holding a substrate;
    a first multiple axis robot for depositing a first weld bead on the substrate, wherein the first multiple axis robot comprises a first welding torch;
    a second multiple axis robot for depositing a second weld bead on the substrate, wherein the second multiple axis robot comprises a second welding torch that is different from the first welding torch; and
    a computing device, including:
      a hardware processor; and
      a machine-readable medium encoded with instructions that, when executed by the hardware processor, performs a method comprising:
        positioning a substrate on a welding positioner base;
        applying a first weld bead to the substrate using the first multiple axis robot;
        applying a second weld bead to the substrate using the second multiple axis robot;
        forming a plurality of weld bead layers comprising the first weld bead and the second weld bead; and
        forming the threaded subsea connector from the plurality of weld bead layers, including the threads.

11. The system of claim 10, wherein the first welding torch comprises a gas tungsten arc welding torch and the second welding torch is a submerged arc welding torch.

12. The system of claim 10, wherein the first welding torch comprises three wires.

13. The system of claim 10, wherein the first weld bead and the second weld bead are applied to the substrate at the same time.

14. The system of claim 10, wherein the substrate is a pipe, and the first weld bead and the second weld bead form a plurality of weld bead layers that form the subsea connector.

15. The system of claim 10, wherein the first weld bead comprises a first metal and the second weld bead comprises a second metal that is different than the first metal.

16. The system of claim 10, wherein the first multiple axis robot and the second multiple axis robot each comprises at least six axes.

17. The system of claim 10, wherein the first welding torch and the second welding torch each comprise at least one wire.

18. A non-transitory computer readable medium comprising computer executable instructions stored thereon that, when executed by one or more processing units cause the one or more processing units to:
- apply a first weld bead comprising a first metal using a first multiple axis robot to a substrate;
- apply a second weld bead comprising a second metal different from the first metal using a second multiple axis robot to the substrate;
- form a plurality of weld bead layers comprising the first weld bead and the second weld bead on the substrate; and
- form a load bearing, threaded subsea connector formed from the plurality of weld bead layers on the substrate, including the threads.

19. The non-transitory computer readable medium of claim 18, wherein the first weld bead is applied using gas tungsten arc welding and the second weld bead is applied using submerged arc welding.

* * * * *